US010544940B2

(12) United States Patent
Loeffel et al.

(10) Patent No.: US 10,544,940 B2
(45) Date of Patent: Jan. 28, 2020

(54) FUEL INJECTOR DEVICE

(71) Applicant: ANSALDO ENERGIA SWITZERLAND AG, Baden (CH)

(72) Inventors: Kaspar Loeffel, Zürich (CH); Yang Yang, Nussbaumen (CH); Adnan Eroglu, Untersiggenthal (CH); Michael Thomas Maurer, Bad Säckingen (DE); Nico Biagioli, Baden (CH); Alexey Stytsenko, Moscow (RU); Sergey Mylnikov, Moscow (RU); Igor Baibuzenko, Moscow (RU)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 602 days.

(21) Appl. No.: 15/084,012

(22) Filed: Mar. 29, 2016

(65) Prior Publication Data
US 2016/0290648 A1 Oct. 6, 2016

(30) Foreign Application Priority Data

Mar. 30, 2015 (EP) ..................................... 15161690

(51) Int. Cl.
*F23R 3/28* (2006.01)
*F23D 11/38* (2006.01)
(Continued)

(52) U.S. Cl.
CPC .............. *F23R 3/283* (2013.01); *F02C 7/222* (2013.01); *F23D 11/383* (2013.01); *F23D 14/24* (2013.01); *F23R 3/286* (2013.01)

(58) Field of Classification Search
CPC ...... F23R 3/14; F23R 3/20; F23R 3/28; F23R 3/283; F23R 3/286; F23R 2900/03341;
(Continued)

(56) References Cited

U.S. PATENT DOCUMENTS 5,511,375 A 4/1996 Joshi et al.
5,634,327 A 6/1997 Kamber et al.
(Continued)

FOREIGN PATENT DOCUMENTS

| EP | 0 718 470 81 | 6/1996 |
| WO | WO 2015/023863 A1 | 2/2015 |
| WO | WO 2015/042009 A1 | 3/2015 |

OTHER PUBLICATIONS

Search Report dated Sep. 18, 2015, by the European Patent Office for Application No. 15161690.1.
(Continued)

*Primary Examiner* — Andrew H Nguyen
(74) *Attorney, Agent, or Firm* — Buchanan Ingersoll & Rooney PC

(57) ABSTRACT

A fuel injector device includes a body having a leading edge and a trailing edge and defining a streamwise direction from the leading edge to the trailing edge. The fuel injector device body includes a first surface and a second surface opposite the first surface, each surface extending between and including the leading edge and the trailing edge, and the surfaces conjoining each other at the leading edge and the trailing edge. The trailing edge, when seen in the streamwise direction, undulates along a trailing edge mean line and, along its extent, deviates in opposite directions from the mean line and includes at least one inflection point along its extent.

14 Claims, 5 Drawing Sheets

(51) Int. Cl.
*F23D 14/24* (2006.01)
*F02C 7/22* (2006.01)

(58) Field of Classification Search
CPC . F23D 2900/14021; F23D 2900/14701; F23D 11/383; F23D 14/24; F23C 2900/07001
See application file for complete search history.

(56) References Cited

U.S. PATENT DOCUMENTS

| | | | |
|---|---|---|---|
| 5,941,064 A | 8/1999 | Chevalier et al. | |
| 2006/0156734 A1* | 7/2006 | Bland | F23R 3/12 60/776 |
| 2007/0151250 A1 | 7/2007 | Haynes | |
| 2009/0184181 A1 | 7/2009 | Berry et al. | |
| 2009/0255265 A1* | 10/2009 | McMasters | B23P 6/007 60/748 |
| 2012/0260622 A1* | 10/2012 | Poyyapakkam | F23C 5/08 60/39.465 |
| 2012/0272659 A1 | 11/2012 | Syed et al. | |
| 2012/0285173 A1 | 11/2012 | Poyyapakkam et al. | |
| 2012/0297777 A1 | 11/2012 | Poyyapakkam et al. | |
| 2012/0297787 A1* | 11/2012 | Poyyapakkam | B01F 5/0451 60/772 |

OTHER PUBLICATIONS

Search Report dated Sep. 16, 2015, by the European Patent Office for Application No. 15161686.9.

Office Action and Search Report dated Dec. 19, 2018, by the Chinese Patent Office in corresponding Chinese Patent Application No. 201610416267.8, and an English Translation of the Office Action. (10 pages).

* cited by examiner

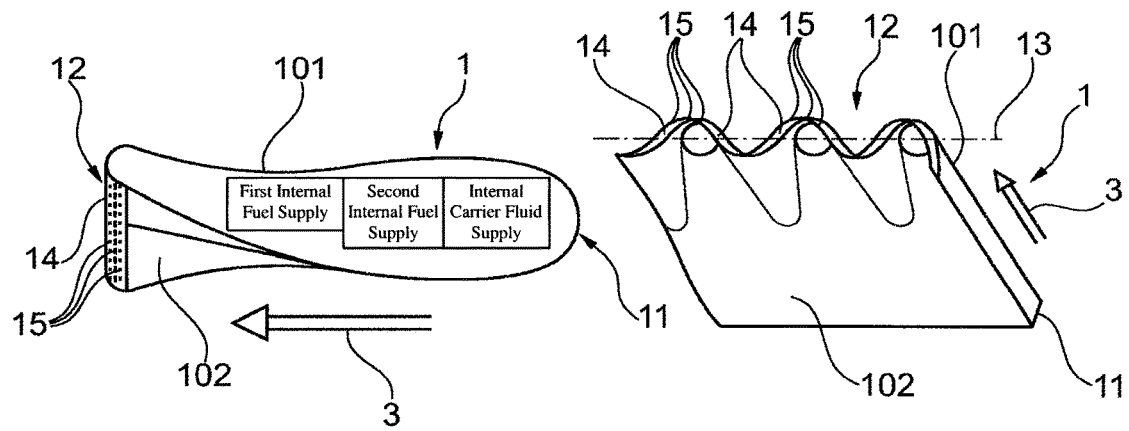
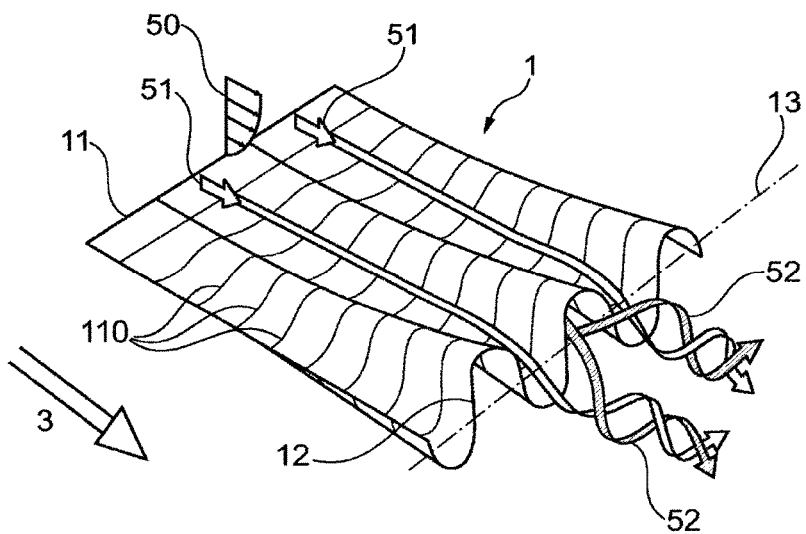

FUEL INJECTOR DEVICE

TECHNICAL FIELD

The present disclosure relates to a fuel injector device. It further relates to a combustor and a gas turbine engine comprising a fuel injector device of the aforementioned type.

BACKGROUND OF THE DISCLOSURE

In combustors, in order to achieve acceptable exhaust gas pollutant levels, thorough mixing of fuel with the oxidant, such as, most commonly used, air, is required before the fuel is burnt. In gas turbines with so-called sequential combustion, such as e.g. described in EP 0 718 470 B1, a subsequent combustor is supplied with partly expanded, still oxygen-rich, flue gas from a preceding turbine serving as the oxidant. In such gas turbines, and there in particular in the subsequent combustors, the oxidant entering the combustor, that is, partly expanded flue gas, has a temperature in excess of a fuel self-ignition temperature. That is, the fuel will after a certain ignition delay time ignite spontaneously. It is thus crucial to achieve a complete and uniform fuel/oxidant mixture within a limited time frame before the fuel ignites. Various proposals as to intensify the fuel/oxidant mixing have been made, and proposals have been made to elongate the time, or, respectively, the distance downstream from the location of fuel injection within the combustor before the fuel ignites. US 2012/0272659 A1 for instance discloses a fuel injector device having a generally airfoil-like shape, with the airfoil trailing edge having an undulating shape across the flow direction, wherein said undulating aerodynamic cross section develops in a streamwise direction from the leading edge to the trailing edge. At the trailing edge, flows having opposite velocity components across the main flow direction meet and intermingle, and develop vortices propagating downstream from the trailing edge, said vortices having a center of rotation essentially at inflection points of the undulating trailing edge. Fuel is discharges into the oxidant flow through fuel discharge means arranged at the trailing edge essentially at said inflection points, and, due to the vortices, is intensively admixed with the oxidant.

LINEOUT OF THE DISCLOSURE

The present disclosure strives for providing means suitable for further improving fuel/oxidant mixing while maintaining the burner pressure drop at a low value. Improved fuel/oxidant mixing allows for higher flame temperature, e.g. in a sequential burner, without suffering drawbacks such as for instance enhanced NOx emissions or flashback.

In another aspect of the present disclosure the manufacturing cost and complexity are considered.

In yet another aspect, the proposed device provides superior mixing quality for dual-fuel combustors, wherein the injection location may be optimized for the respective type of fuel.

Further effects and advantages of the disclosed subject matter, whether explicitly mentioned or not, will become apparent in view of the disclosure provided below.

Disclosed is a fuel injector device comprising a body, said body comprising a leading edge and a trailing edge and defining a streamwise direction from the leading edge to the trailing edge, the body further comprising a first surface and a second surface opposite the first surface, each of said surfaces extending between and comprising the leading edge and the trailing edge, and said surfaces conjoining each other at the leading edge and the trailing edge. The trailing edge, when seen parallel to the streamwise direction, undulates along a trailing edge mean line and, along its extent, deviates in opposite directions from said mean line and further comprises at least one inflection point along its extent. That is, the trailing edge extends in an undulating manner across a main flow direction, said main flow direction being directed from the leading edge to the trailing edge. In still other words, the trailing edge is curved in different, opposite directions in a plane across the main flow direction. The fuel injector device further comprises at least one first internal fuel supply means and at least one first fuel discharge duct fluidly connecting the at least one first internal fuel supply means with a first fuel discharge means opening out to the exterior of the injector device, wherein at least one first fuel discharge duct terminates at a first fuel discharge means arranged at the trailing edge. At least one first fuel discharge means is arranged at the trailing edge between two trailing edge inflection points.

The trailing edge is curved or undulating in the streamwise direction, such that a streamwise extent of the injector device body varies in different injector device longitudinal sections, whereas the longitudinal section is understood as a section cut along the streamwise direction of the body.

The body of the fuel injector device may in particular have an aerodynamic longitudinal section. Downstream, along the streamwise direction, the body develops an increasingly undulated shape when seen in the streamwise direction, with an amplitude of the undulation increasing from the leading edge, or a position downstream the leading edge, towards the trailing edge. In particular embodiments, the body is not undulated at the leading edge. The leading edge may be straight such that an essentially bar-shaped fuel injector device is provided, or curved in one direction only, and may in particular describe a circular or part-circular shape. The fuel injector device may then assume a can-shape, a part-cylindrical shape, a frustoconical shape or a part-frustoconical shape. An exemplary bar-shaped fuel injector device body is disclosed in US 2012/0272659 A1, which document in this respect is incorporated by reference.

It is found that in distributing the fuel discharge means more evenly along the trailing edge, a small vortex is generated between the injected fuel beams. As a consequence, surprisingly, it is found that the fuel/oxidant mixing is improved even though the fuel is not, or not exclusively, injected into the vortices generated by the shape of the injector device, or its undulating shape, respectively, said vortices being located at least essentially at the trailing edge inflection points.

The fuel needs to be provided to the fuel discharge means through fuel supply means and fuel supply ducts arranged inside the fuel injector device. As is apparent, this results in a complex internal structure of the fuel injector device. The geometry possible for the supply ducts has so far been largely restricted. This gets even more accentuated if the need to provide adequate cooling to the injector device, and thus arranging internal coolant channels, is considered. A supply and discharge means for a fuel carrier fluid may be present. Also, in case dual fuel capability is strived for, multiple fuel supply and discharge systems need to be provided. Internal cavities need to be provided which are not accessible for chip removing tools. Consequently, a fuel discharge means as disclosed in US 2012/0272659 A1 needs to be assembled from a multitude of individual components. This assembly step, however, is expensive, time consuming, and puts practical constraints on the possible complexity of the fuel injector device. Moreover, it needs to be considered that an element comprising a multitude of weld seals arises, which may need to withstand high loads at temperatures of e.g. close to or even in excess of 1000° C.

In an aspect of the present disclosure it is thus proposed to provide the fuel injector device as a seamless, monolithic one-piece device. Such a device may for instance be produced by an additive production method. For instance, metal powder may be molten and re-solidified at specific locations such that a solid body is generated. Such additive manufacturing processes may comprise, while not being limited to, selective laser melting or selective electron beam melting.

In certain embodiments, the fuel injector device according to the present disclosure may be characterized in that a multitude of first fuel discharge means, that is, at least two fuel discharge means, are arranged at the trailing edge between two trailing edge inflection points. As a matter of course, said multitude of first fuel discharge means may comprise more than two first fuel discharge means, and may for instance be 4 or more, 5 or more, or 10 or more first fuel discharge means arranged between two trailing edge inflection points. In more specific embodiments of the fuel injector device, a first fuel discharge means may define a fuel discharge direction and the injector device body may define a local trailing edge flow direction at the location of said first fuel discharge means, and the fuel injector device may be characterized in that at least for one first fuel discharge means the fuel discharge direction is different from the local trailing edge flow direction. It is understood by the person of skill in the art that the fuel discharge direction is given by the geometry and arrangement of the fuel discharge means. For instance in case of a cylindrical bore provided as a fuel discharge means the fuel discharge direction is at least essentially identical with the bore axis. Also, the trailing edge flow direction will be readily understood as a direction clearly defined by the geometry of the fuel injector device body at the trailing edge, and may for instance be at least essentially identical with an airfoil skeleton line at the trailing edge. The local trailing edge flow direction consequently is provided by the trailing edge geometry at a certain point along the undulating trailing edge extent.

Embodiments are conceivable wherein at least two first fuel discharge means define different fuel discharge directions and/or define fuel discharge directions having different angles with the local trailing edge flow direction. Other embodiments are conceivable wherein all first fuel discharge means define a fuel discharge direction which is at least essentially in line with the local trailing edge flow direction.

In providing a multitude of fuel discharge means, a multitude of small vortices is generated which further improve mixing, as lined out above. Moreover, if an angle is provided between the direction of a discharged fuel beam and the trailing edge flow direction at the specific location, additional shear forces between the fuel and the oxidant are generated which serve to even more intensify fuel/oxidant mixing.

The fuel discharge means, or a discharge opening of said means, respectively, may have various geometries, such as, but not limited to, e.g. round, circular, elliptical, polygon-shaped or slot-shaped, and in particular with a slot longitudinal extent extending along the trailing edge extent. A slot may also have rounded narrow sides and remind of an oval. A slot may also have a curved longitudinal axis. Generally, a geometry in which the fuel discharge means discharge opening has a dimension in one direction exceeding the dimension in a perpendicular direction by 100% or more may be considered a slot. The dimension in one direction may also exceed the dimension in another, perpendicular, direction by 200% or more or 250% or more, and in particular by 300% and more. A slot-shaped fuel discharge opening will result in an enlarged surface of a discharged fuel beam, and may thus serve to intensify mixing. It will be appreciated that in one fuel injector device several fuel discharge means geometries may be combined. It will further be appreciated that the geometry of the fuel discharge openings will have an influence on the flow field and accordingly on the mixing efficiency and location, and the skilled person will thus be able to adjust these parameters in appropriately choosing the discharge means geometry.

According to yet another aspect of the present disclosure, the fuel injector device as described herein is characterized in that it comprises at least one second internal fuel supply means and at least one second fuel discharge means provided on the undulating trailing edge of the fuel injector device, and opening out to the exterior of the fuel injector device, and a second fuel discharge duct fluidly connecting the second fuel supply means and the second fuel discharge means. In particular embodiments, the number of first fuel discharge means is larger than the number of second fuel discharge means. In more specific embodiments the second fuel discharge means is and/or a multitude of second fuel discharge means are arranged on inflection points of the trailing edge. In particular, each second fuel discharge means of a multitude of second fuel discharge means may be arranged on an inflection point of the trailing edge, and/or a second fuel discharge means may be provided at each trailing edge inflection point.

The at least one first fuel discharge means, and in particular the multitude of first fuel discharge means, may be arranged and configured for the discharge of a gaseous fuel. The at least one second fuel discharge means, and in particular the multitude of second fuel discharge means, where present, may be provided for the discharge of a liquid fuel and may in particular be liquid fuel nozzles. If first and second fuel discharge means are present, the fuel injector device is suited for dual fuel operation, that is for selective and/or simultaneous operation on gaseous and liquid fuel, for instance on natural gas and fuel oil.

Providing liquid fuel discharge means on inflection points of the trailing edge, that is, discharging liquid fuel into the intense, large scale vortices, and providing gaseous fuel discharge means between said inflection points, that is, discharging gaseous fuel into an area of smaller scale, less intense vortices, may serve to enhance dual fuel capability, as the denser and harder to mix liquid fuel is admixed with support of the stronger vortices, while the lighter fuel is admixed by the less intense vortices. This may serve to align the time, or, respectively, downstream distance until complete admixture is reached. However, this embodiment is not mandatory.

According to further aspects of the present disclosure, a carrier fluid discharge means may be present adjacent a fuel discharge means and/or encircling the fuel discharge means such as to provide a carrier fluid flow for the discharged fuel. The carrier fluid may serve to provide some shielding effect, isolating the fuel from the oxidant which is present at elevated temperatures, and thus to avoid early spontaneous ignition of the fuel. Accordingly, the fuel injector device according to this aspect is characterized in that it comprises at least one internal carrier fluid supply means and at least one carrier fluid discharge duct fluidly connecting the carrier fluid supply means with at least one carrier fluid discharge means, said discharge means opening out to the exterior of the injector device. At least one carrier fluid discharge means is provided adjacent a first or second fuel discharge means. The carrier fluid discharge means may be an annular opening encircling the first or second fuel discharge means. In particular embodiments two, and more in particular at least two, carrier fluid discharge means are arranged adjacent a fuel discharge means, and more in particular on opposite sides of said fuel discharge means, thus enhancing the shielding effect.

The carrier fluid discharge means may for instance be annularly shaped and encircling the fuel discharge means, but may also be slot-shaped, wherein slot shaped is to be understood as lined out above in connection with the fuel discharge means.

Embodiments are conceivable within the scope of the present disclosure wherein carrier fluid discharge means are arranged adjacent, and in particular encircling, a second fuel discharge means and are not arranged adjacent first fuel discharge means, as well as embodiments wherein carrier fluid discharge means are arranged adjacent, and in particular encircling, a first fuel discharge means and are not arranged adjacent second fuel discharge means. Likewise, embodiments are conceivable within the scope of the present disclosure wherein carrier fluid discharge means are arranged adjacent, and in particular encircling, a second fuel discharge means and adjacent, and in particular encircling, a first fuel discharge means.

In specific embodiments, the fuel injector device as described above is seamless. That is, it is not assembled from a multitude of parts, but is a monolithic, one-piece element.

Further, in yet another aspect of the present disclosure, the fuel injector device is manufactured by an additive manufacturing process, in particular by one of a selective laser melting process and/or a selective electron beam melting process. This is particularly well-suited to obtain a seamless, monolithic one-piece fuel injector device as mentioned above.

Further disclosed is a combustor, in particular a gas turbine combustor, comprising a fuel injector device according to the present disclosure.

Still further disclosed is gas turbine comprising a combustor of the aforementioned kind, wherein in particular the gas turbine is a sequential combustion gas turbine engine and more in particular the combustor is a subsequent combustor which is supplied with partly expanded flue gas from a turbine, as is disclosed for instance in EP 0 718 470, the respective disclosure of said document being incorporated herein by reference.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a fuel injector means according to the present disclosure in a side view and a perspective view;

FIG. 2 a schematic depiction of the flow over a fuel injector means as disclosed herein;

Figure 3A:
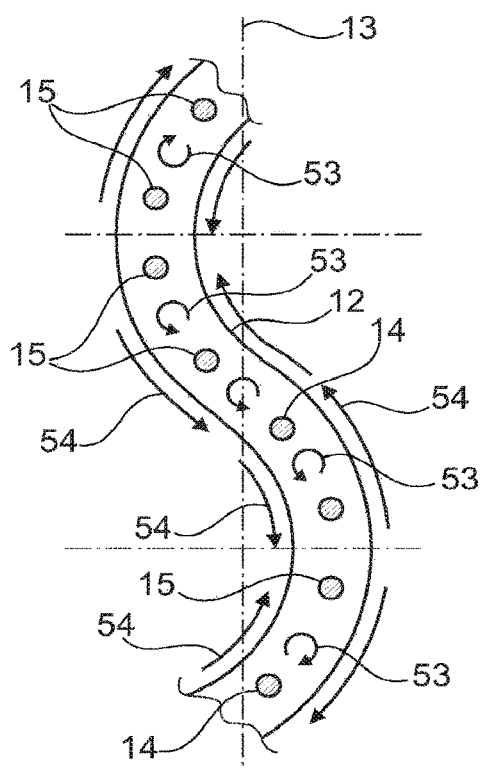
FIG. 3A is a view of the trailing edge in an upstream direction according to an exemplary embodiment of the disclosure.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein claimed subject matter.

EXEMPLARY MODES OF CARRYING OUT THE TEACHING OF THE PRESENT DISCLOSURE

A general view of an exemplary embodiment of the fuel injector device according to the present disclosure is shown in FIG. 1. The left part of the figure shows a side view, while the right part of the figure shows a perspective view. As is seen in the side view, the fuel injector device 1 comprises a body, having, in a longitudinal section, an aerodynamic shape, generally resembling an airfoil. The fuel injector device comprises a leading edge 11 and a trailing edge 12, and has a streamwise direction from the leading edge to the trailing edge depicted by the arrow at 3. The fuel injector device body further comprises a first surface 101 and a second surface 102 opposite the first surface, each of said surfaces extending between and comprising the leading edge and the trailing edge, and said surfaces conjoining each other at the leading edge and the trailing edge. These surfaces may in the depicted view also be referred to as upper surface 101 and lower surface 102. As is visible, the profile of the airfoil-shaped longitudinal section changes from one longitudinal section to a neighboring longitudinal section across the fuel injector device body, resulting in a trailing edge 12 undulating when seen in, or against, respectively, the streamwise direction, or, across a main flow direction as given by the body streamwise direction 3. The trailing edge 12 undulates along a trailing edge mean line 13 and, along its extent, deviates in opposite directions from said mean line. The sense of curvature of the trailing edge changes along its extent, i.e. left-hand curved sections alternate with right-hand curved sections. It thus comprises a number of inflection points 14 along its extent, the inflection points, in the embodiment provided for reference, being located on the trailing edge mean line 13. Fuel supply means, not visible in the depiction, are provided inside the fuel injector device body. A number of fuel discharge means 15 are provided along the trailing edge at locations between the inflection points, not excluding the presence of fuel discharge openings at the inflection points, and are in fluid communication with the fuel supply means.

The flow conditions around the fuel injector device body 1 are illustrated in more detail in FIG. 2, which is a schematic illustration of the injector device body surface. An incident flow flows against the leading edge 11, forming a flow profile depicted at 50. In various cross sectional views 110, the shape of the fuel injector device body develops an undulating shape, with an amplitude of the undulation growing from the leading edge 11 towards the trailing edge 12. The surfaces 101, 102 of the injector device body thus comprise flutes and ridges, with increasing depth, or height, respectively, towards the trailing edge. The total flow is split up into individual flows 51 through the flutes. At the trailing edge, two flows having opposite velocity components across the streamwise direction 3 meet and form vortices 52, having a center of rotation at least approximately at the inflection points of the trailing edge.

Figure 3B:
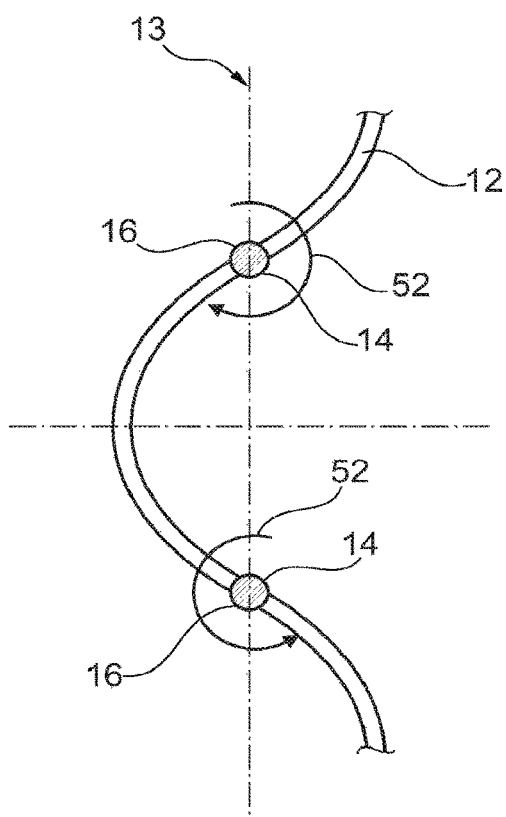
FIG. 3B is a view of a trailing edge in an upstream direction according to a known arrangement.

With reference to FIG. 3A, a view onto the trailing edge 12 is shown in, or respectively against, the streamwise direction, that is, an upstream view onto the trailing edge. The main flow around the injector device body is depicted by arrows 54 in FIG. 3A. As is seen in FIG. 3A, a multitude of fuel discharge means 15 are arranged between inflection points 14 of the trailing edge. When discharging fuel therethrough, the emerging fuel beams partly block coalescence of the flows on the different sides of the injector device body, while between the fuel discharge means the flows merge, forming small-scale vortices 53. These vortices admix fuel discharged at first fuel discharge means 15 fast and efficiently. As a comparison, in FIG. 3B the situation as known in the art, and in addition also present in the disclosed device, is shown, wherein large scale vortices 52 emerge with the center of rotation at least essentially at the trailing edge inflection points. In the example shown in FIG. 3B, second fuel discharge means 16 are arranged on the trailing edge at the location of the inflection points 14, in order to discharge fuel into the center of the vortices 52. As will be lined out below, both effects and arrangements of fuel discharge means may efficiently be combined.

Figure 4:
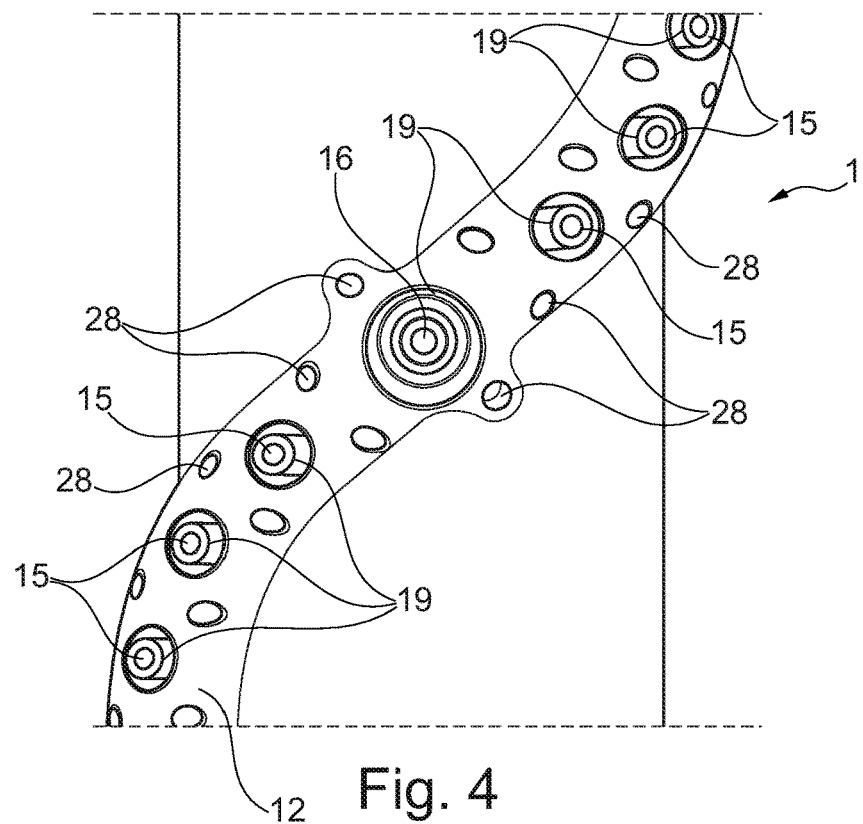
FIG. 4 a more detailed view of a part of the trailing edge, comprising first and second fuel discharge means.
Figure 5:
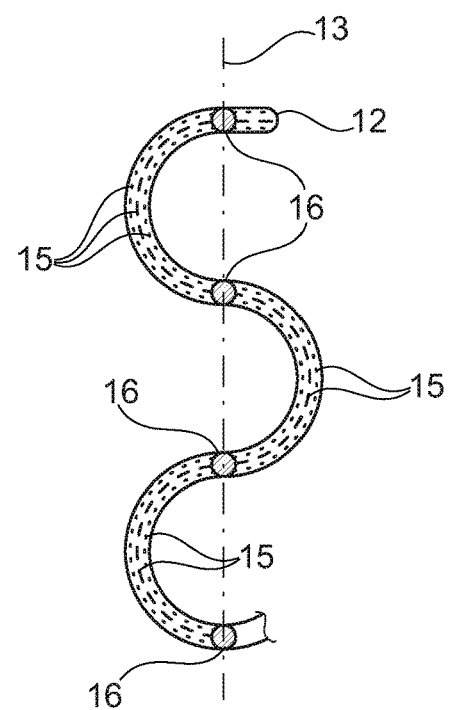
FIG. 5 a view of a trailing edge of a device described herein with first and second fuel discharge means.

With reference to FIG. 4, a part of an embodiment is shown wherein a multitude of first fuel discharge means 15 is provided on an undulating trailing edge 12. As is obvious, although only one inflection point is visible in this depiction, first fuel discharge means 15 are arranged between inflection points of the trailing edge. A second fuel discharge means 16 is located at the inflection point. The fuel discharge means 15 and 16 are encircled by annular carrier fluid discharge means 19. Moreover, trailing edge cooling air discharge openings 28 are provided on the trailing edge, which serve to discharge cooling air from near wall cooling channels which run inside the fuel injector device body close to the surfaces. The first fuel discharge means 15 outnumber the second fuel discharge means 16. As shown in FIG. 5, a second fuel discharge means 16 may be provided at each inflection point of a trailing edge 12, while a multitude of first fuel discharge means 15 may be arranged on the trailing edge between the inflection points. In particular, the first fuel discharge means 15 may be configured and arranged for the discharge of a gaseous fuel, whereas the second fuel discharge means 16 may be arranged and configured for the discharge of a liquid fuel. In this embodiment, liquid fuel is discharged into large-scale vortices, while the gaseous fuel is discharged into smaller scale vortices, as lined out in connection with FIG. 3 above. It is obvious, that this embodiment is particularly well-suited for dual fuel applications, in which a gaseous fuel and a liquid fuel are discharged from the fuel injector means selectively or simultaneously.

Figure 6:
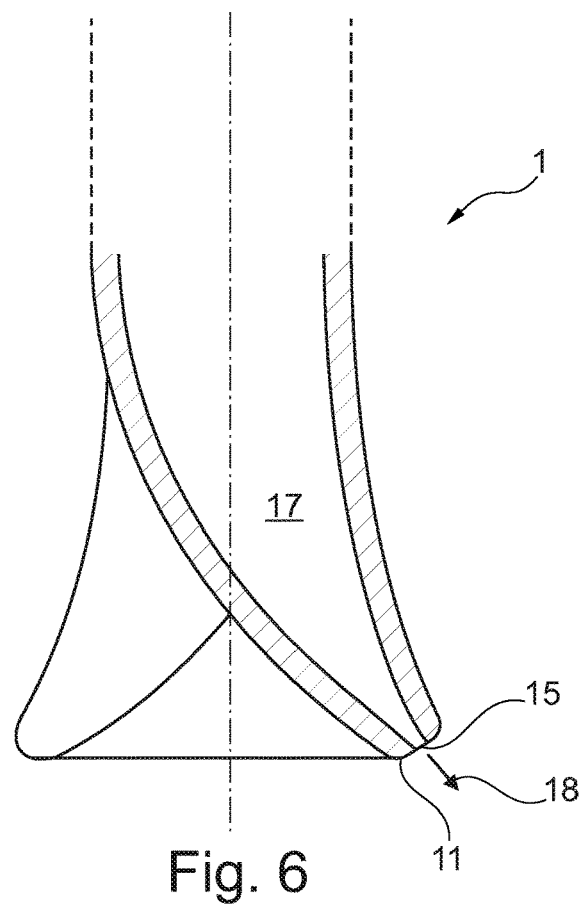
FIG. 6 a longitudinal section of the trailing edge region.

In FIG. 6, a longitudinal section of the fuel injector device at the trailing edge is shown. Inside the fuel injector device 1 a first fuel discharge duct 17 is formed, which at its downstream end forms a fuel discharge means 15, and which on its upstream end is connected to a fuel supply means (not shown). A fuel supplied to the fuel supply means is discharged through a multitude of fuel discharge ducts 17 and corresponding fuel discharge means 15 to the exterior of the fuel injector device as fuel beam 18.

Figure 7:
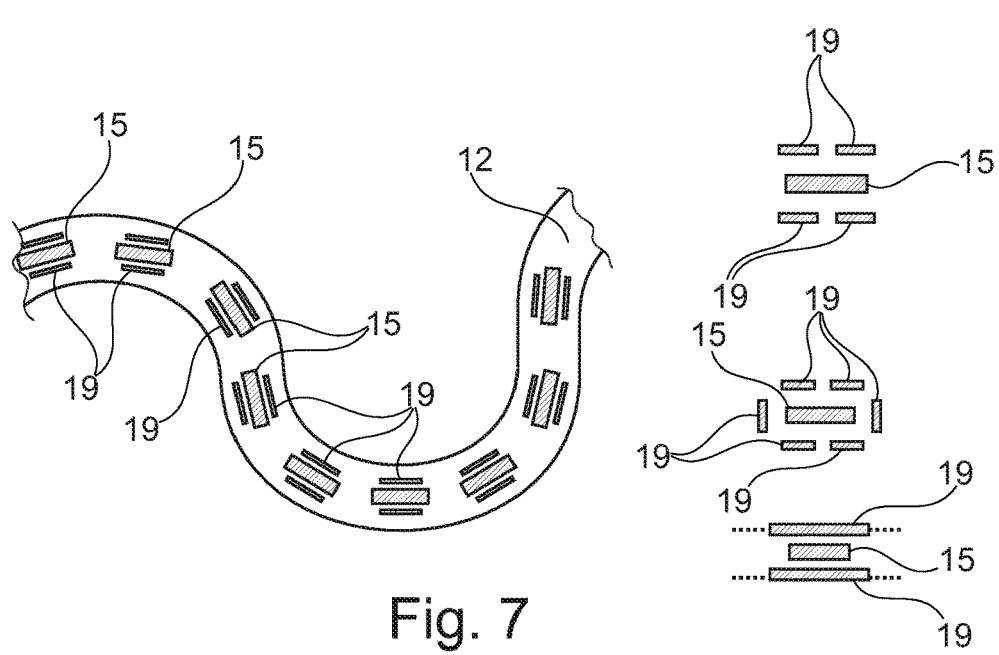
FIG. 7 exemplary embodiments of fuel discharge means with carrier air discharge means being disposed adjacent to the fuel discharge means.

FIG. 7 lines out alternative arrangements and geometries of the first fuel discharge means 15. The fuel discharge means 15 are, in this embodiment, arranged on the trailing edge 12 in the form of slots. A carrier fluid discharge means 19 is arranged adjacent each fuel discharge means 15 along each of the fuel discharge means longitudinal sides and on opposite sides of the fuel discharge means. A carrier fluid discharged from said means is suited to shield fuel discharged at the fuel discharge means 15 against hot gases and may thus help to further delay the self-ignition of the fuel. Various exemplary arrangements of fuel discharge means 15 and carrier fluid discharge means 19 are shown on the right-hand side of FIG. 7.

Figure 8:
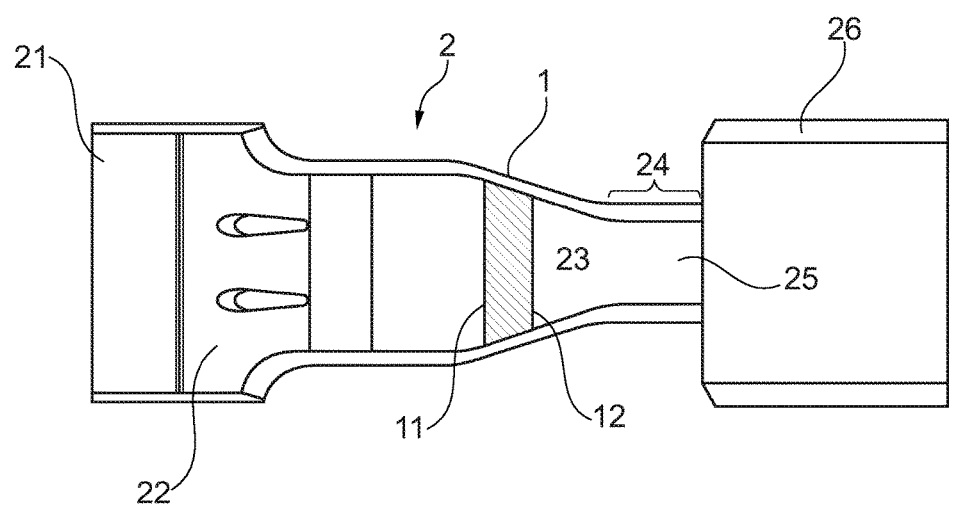
FIG. 8 a combustion chamber comprising a fuel injector means as described above.

FIG. 8 depicts the application of the fuel injector device as described above in a combustion chamber, in particular in a combustion chamber 2 for sequential combustion, as disclosed for instance in EP 0 718 470 B1. The upstream end 21 is, in a manner known in the art, connected to the exhaust flow of a preceding turbine stage and typically receives still oxygen-rich flue gas from said turbine, which may be used as an oxidant for the subsequent combustion stage. The gas entering into combustion chamber 2 typically is in the temperature range of several hundred ° C., close to 1000° C., and even in excess of 1000° C. Fuel brought into full contact with this hot gas will thus spontaneously ignite after a short ignition delay time. Flow conditioning elements 22, suited to even out the highly turbulent flow emanating from the upstream turbine, are arranged in a flow path. The fuel injector device 1 is arranged at the location of the combustion chamber where the flow path narrows. The hot gas or hot oxidant flow introduced into the combustion chamber 2 at the upstream end 21 flows over the fuel injector device leading edge 11, and forms the vortices as described above at the undulating trailing edge 12. Fuel is discharged at the trailing edge 12 and enters, together with the oxidant, a mixing zone 23 of the combustion chamber, formed in a narrowed section 24. Due to the discharge of the fuel into the vortices formed downstream trailing edge 12, the fuel is intensely mixed with the hot oxidant. The narrowed or bottleneck section 24 accelerates the flow, such as to avoid a flashback of the flame into the mixing zone 23. Furthermore, due to the narrowed section 24, the residence time of the fuel/oxidant mixture in the mixing zone 23 is shortened. This, in turn, is suited to avoid spontaneous self-ignition of the fuel inside the mixing zone. Due to the intense fuel/oxidant mixing achieved in applying the fuel injector device as described herein, the fuel and the oxidant are completely mixed upon reaching the cross-sectional jump 25, and entering the actual combustion zone 26 where the fuel/oxidant mixture is burnt.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

LIST OF REFERENCE NUMERALS 1 fuel injector device
2 combustion chamber 3 streamwise direction
11 leading edge
12 trailing edge
13 trailing edge mean line
14 inflection point
15 first fuel discharge means
16 second fuel discharge means
17 first fuel discharge duct
18 fuel beam
19 carrier fluid discharge means
21 combustion chamber upstream end
22 flow conditioning elements
23 mixing zone
24 narrowed section
25 cross sectional jump
26 reaction zone
28 cooling air discharge openings
50 flow profile
51 flow
52 large scale vortex
53 small scale vortex
54 main flow
101 first surface, upper surface
102 second surface, lower surface
110 injector device body cross section

The invention claimed is:

1. A fuel injector device comprising:
a body, said body having a leading edge and a trailing edge and defining a streamwise direction from the leading edge to the trailing edge, the fuel injector device body including a first surface and a second surface opposite the first surface, each of said surfaces extending between and including the leading edge and the trailing edge and said surfaces conjoining each other at the leading edge and the trailing edge, wherein the trailing edge, when seen in the streamwise direction, undulates along a trailing edge mean line and, along its extent, deviates in opposite directions from said mean line and includes at least two inflection points and at least one apex along its extent, wherein the at least two inflection points are located on the mean line, and
at least one first internal fuel supply and at least one first fuel discharge duct fluidly connecting the at least one first internal fuel supply with at least one first fuel discharger opening out to an exterior of the injector device, wherein the at least one first fuel discharge duct terminates at the at least one first fuel discharger arranged at the trailing edge,
wherein at least two first fuel dischargers of the at least one first fuel discharger are arranged at the trailing edge, an entirety of each of the at least two first fuel dischargers being arranged between a first inflection point of the at least two inflection points and a first apex of the at least one apex, wherein the first apex is the apex nearest to the first inflection point.

2. The fuel injector device according to claim 1, wherein the at least two first fuel dischargers are slot-shaped and have a slot longitudinal extent extending along the trailing edge.

3. The fuel injector device according to claim 1, comprising: at least one second internal fuel supply and at least one second fuel discharge duct fluidly connecting the at least one second internal fuel supply with at least one second fuel discharger provided on the trailing edge and opening out to the exterior of the fuel injector device.

4. The fuel injector device according to claim 3 wherein the number of the at least two first fuel dischargers is larger than the number of the at least one second fuel discharger.

5. The fuel injector device according to claim 3, wherein the at least one second fuel discharger or a multitude of the at least one second fuel discharger are arranged on the at least two inflection points of the trailing edge.

6. The fuel injector device according to claim 3, wherein the at least one second fuel discharger is arranged and configured for the discharge of a liquid fuel and are liquid fuel nozzles.

7. The fuel injector device according to claim 1, wherein the at least two first fuel dischargers are arranged and configured for the discharge of a gaseous fuel.

8. The fuel injector device according to claim 1, comprising: at least one internal carrier fluid supply and at least one carrier fluid discharge duct fluidly connecting the at least one carrier fluid supply with at least one carrier fluid discharger opening out to the exterior of the injector device, wherein a respective carrier fluid discharger of the at least one carrier fluid discharger is provided adjacent each of the at least two first fuel dischargers and encircling each of the at least two first fuel dischargers.

9. The fuel injector device according to claim 1, wherein at least two carrier fluid dischargers are arranged adjacent each of the at least two first fuel dischargers and on opposite sides of each of said at least two first fuel dischargers.

10. The fuel discharge means according to claim 1, further comprising at least one carrier fluid discharger, wherein the at least one carrier fluid discharger is slot-shaped.

11. The fuel injector device according to claim 1, wherein the fuel injector device is seamless.

12. The fuel injector device according to claim 1, manufactured by additive manufacturing using a selective laser melting process and/or a selective electron beam melting process.

13. A combustor, comprising:
a fuel injector device according to claim 1.

14. A gas turbine comprising:
a combustor according to claim 13, wherein the gas turbine is a sequential combustion gas turbine engine and the combustor is a subsequent combustor arranged to be supplied with partly expanded flue gas from a turbine.

* * * * *